United States Patent [19]

Hardy et al.

[11] Patent Number: 4,516,186
[45] Date of Patent: May 7, 1985

[54] MULTI-LAYER POWER CAPACITOR

[75] Inventors: Patrick Hardy, Auxonne; Michel Cantagrel, Ruffey-Les-Echirey; Serge Guichard, Genlis, all of France

[73] Assignee: LCC.CICE-Compagnie Europeenne de Composants Electroniques, Paris, France

[21] Appl. No.: 555,621

[22] Filed: Nov. 28, 1983

[30] Foreign Application Priority Data

Nov. 26, 1982 [FR] France ................................ 82 19926

[51] Int. Cl.³ .................... H01G 1/14; H01G 4/10; H05K 7/02
[52] U.S. Cl. .................... 361/306; 361/321; 361/400
[58] Field of Search .......... 361/306, 308–310, 361/321, 400–404

[56] References Cited

U.S. PATENT DOCUMENTS

| | | | |
|---|---|---|---|
| 3,648,132 | 3/1972 | Rayburn | 361/321 X |
| 4,004,200 | 1/1977 | Johanson | 361/321 X |
| 4,139,881 | 2/1979 | Shimizu et al. | 361/400 |
| 4,151,579 | 4/1979 | Stark | 361/404 X |
| 4,222,090 | 9/1980 | Jaffe | 361/404 X |

FOREIGN PATENT DOCUMENTS

| | | |
|---|---|---|
| 464680 | 5/1946 | Belgium . |
| 2440064 | 5/1980 | Belgium . |
| 0017529 | 10/1980 | European Pat. Off. . |
| 0043779 | 1/1982 | European Pat. Off. . |
| 893559 | 10/1953 | Fed. Rep. of Germany . |

OTHER PUBLICATIONS

The Electronic Engineer, vol. 27, No. 12, Dec. 1968, N.Y., "Capacitors operate at 1100° F. without supplemental cooling", p. 14.

Primary Examiner—Donald A. Griffin
Attorney, Agent, or Firm—Oblon, Fisher, Spivak, McClelland & Maier

[57] ABSTRACT

The present invention provides a multi-layer capacitor. It has internal electrodes extending over a part at least of each layer and connected electrically and thermally alternately to one or other of two terminals extending over a junction edge of the capacitor and over a part at least of a lateral edge adjacent said junction edge. To each of the terminals is soldered an electrical connection adapted to provide also heat drainage. Such a structure improves the drainage of the heat dissipated in the capacitor during operation under high reactive power or at high frequency.

7 Claims, 10 Drawing Figures

FIG_1
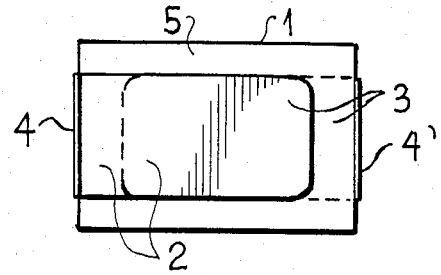
FIG_2·a
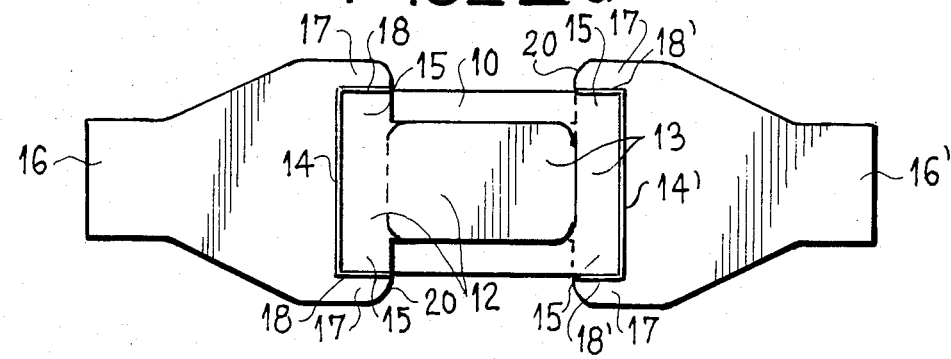
FIG_2·b
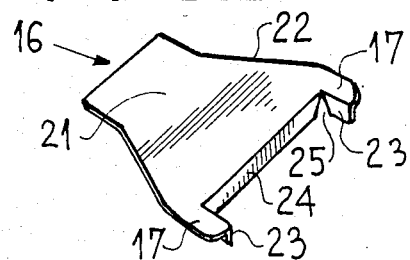
FIG_3
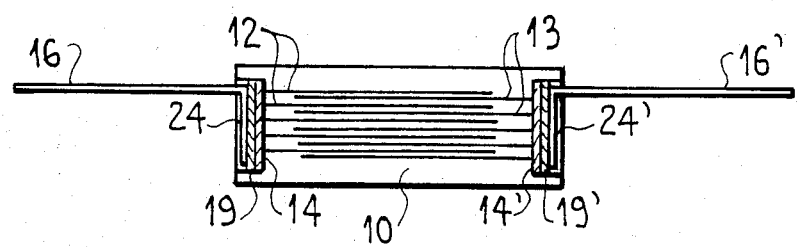

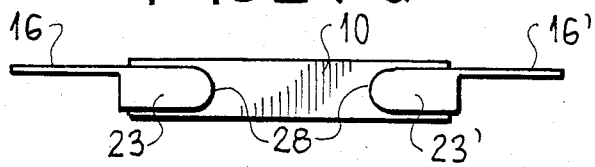
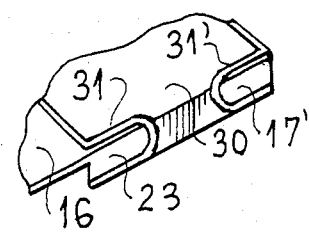
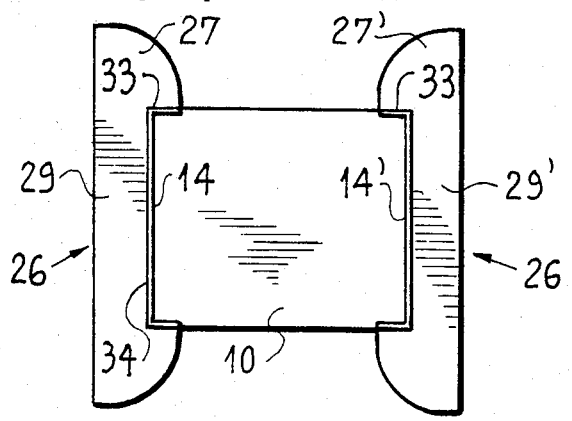
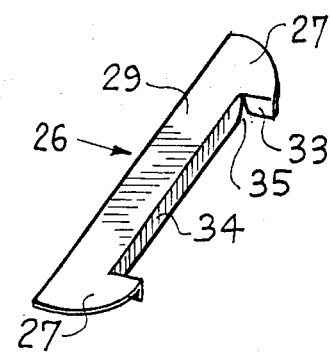
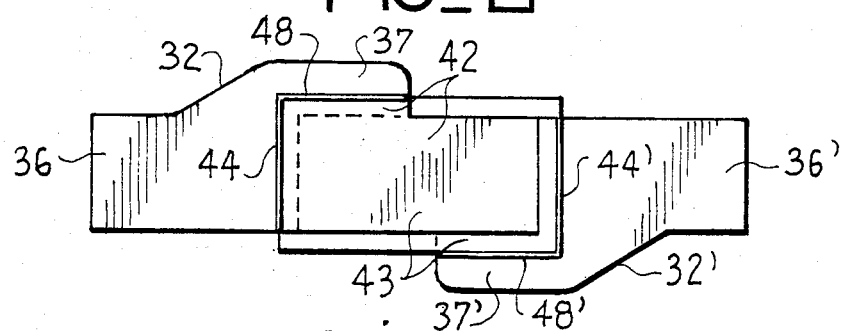
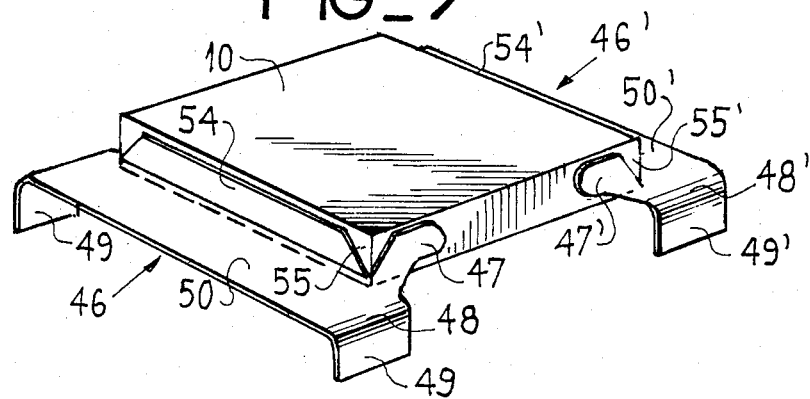

MULTI-LAYER POWER CAPACITOR

BACKGROUND OF THE INVENTION

1. Field of the Invention

The present invention relates to a multi-layer power capacitor, capable of operating under high reactive power or at high frequency.

2. Description of the Prior Art

Multi-layer power capacitors are already known having internal electrodes extending over a part at least of each layer and connected electrically and thermally alternately to one or other of two terminals extending over a junction edge of the capacitor and to each of which an electrical connection is soldered. These internal electrodes leave existing at the edges adjacent the junction edge of the capacitor an insulating border favorable to the voltage resistance of the capacitor.

SUMMARY OF THE INVENTION

The present invention provides a capacitor having a structure optimizing the heat drainage at the level of the electrical connections and thus allowing the capacitor to opperate at reactive powers much higher than before, all other things being equal.

In the capacitor of the invention, each connection, the corresponding terminal and internal electrodes are in electric and thermal contact at the junction edge of the capacitor and over a part at least of an edge adjacent said junction edge.

This structure presents several advantages. On the one hand, the thermal contact area between the internal electrodes, the terminals and the connections is large which is favorable for draining the heat which is dissipated in the capacitor during operation thereof. On the other hand, for equal reactive power, the power dissipated in the capacitor is reduced because, since the internal electrodes have a larger area than in the prior art and are in electrical contact with the connections over a much larger contour than in the prior art, the series resistance of the capacitor, an important dissipation factor and practically the sole dissipation factor at high frequencies, is thus reduced.

Furthermore, the fact that the internal electrodes extend to at least one of the edges adjacent the junction edges to form a thermal and electric connection with a corresponding part of the terminal does not disturb the voltage resistance of the capacitor.

The edges of the connections which are facing each other on the lateral edges may be rounded.

The edges of the connections which are facing each other on the lateral edges may be disposed in anti-corona notches.

The internal electrodes may be in the shape of a T whose bar is, at its upper and lateral parts, in electric and thermal contact with the corresponding terminal.

The connections may each comprise, in a first variant, a flat region so that they may be mounted directly on a thermal bridge of the user circuit.

The connection comprises, in a second variant, curved portions for connection thereof with the user circuit.

BRIEF DESCRIPTION OF THE DRAWINGS

The invention will be better understood from reading the following description given by way of non limiting example, with reference to the accompanying drawings in which:

FIG. 1 is a top view with parts cut away showing the upper internal electrode of a capacitor of the prior art;

FIG. 2a shows a top view with parts cut away showing the upper internal electrode of a capacitor in accordance with one embodiment of the invention;

FIG. 2b is a perspecive view of a connection corresponding to the embodiment of FIG. 2a;

FIG. 3 is a vertical section of a capacitor according to the embodiment of FIG. 2a;

FIGS. 4a and 4b are side views showing two variants of a capacitor in accordance with the embodiment of FIG. 2a;

FIG. 5a shows a top view of a variant of the capacitor according to the invention;

FIG. 5b is a perspective view showing a connection of a capacitor according to the embodiment of FIG. 5a and FIG. 6 is a top view showing another variant of a capacitor in accordance with the invention.

FIG. 7 is a perspective view of another variant of the capacitor in accordance with this invention.

DESCRIPTION OF THE PREFERRED EMBODIMENTS

In FIG. 1, a multi-layer capacitor of the ceramic type of the prior art comprises a stack of internal electrodes having a generally rectangular shape. The internal electrodes 2 and 3 are connected electrically alternately to one or other of two terminals 4 and 4' to which will bo soldered an electrical connection, not shown. The internal electrodes 2 and 3 do not extend over the whole width of the ceramic surface 1 but leave existing at the sides two strips 5 for providing insulation of the internal electrodes with respect to each other. The effective area of the internal electrodes is rectangular in shape and is materialized by the common superimposed surfaces thereof.

In FIGS. 2a and 2b, a multi-layer power capacitor in accordance with the invention comprises internal electrodes 12 and 13 which, in the vicinity of terminals 14 and 14', extend over the whole width of the available surface so as to be connected electrically and thermally to the portions of terminals 18 and 18' respectively which are the extension of terminals 14 at the edges adjacent the junction edges of the capacitor where the terminals were disposed in the prior art. The internal electrodes thus have a T shape, the bar of which is in electrical and thermal contact with the corresponding terminal at its upper part and on its lateral edges. As in the prior art, the useful area of the internal electrodes is defined by a rectangular contour representing the surface common to the superimposed internal electrodes. This configuration presents different advantages which all tend to increase the reactive power accepted by the capacitor. On the one hand, increasing the area of the internal electrodes results in a reduction of the series resistance of the capacitor, i.e. the heat dissipation of the capacitor will be lower for equal reactive powers. On the other hand, the electric contact surface between internal electrodes and connections 16 and 16' through terminals 14 and 14' is increased, which lowers the electrical contact resistance between the electrodes and the connections. Finally, and this is the preponderant element, the thermal contact surface between the internal electrodes and the connection is also increased in the same proportions, which considerably increases the removal of the heat dissipated in the capacitor, i.e. for equal reactive power and equal power dissipated in the capacitor, the temperature reached at all points of the capacitor will be lowered or else, for a maximum given accepted temperature inside the capacitor, the reacitve power may be increased. In practice, this improvement allows the admissible reactive power of the capacitor to be increased in a ratio of for example 2 to 4.

In FIG. 2b, a terminal 16 has a flat part 21 widening at 22 so as to join up with two lateral parts 17 each having a tongue 23 for soldering to the corresponding lateral portion 18 of terminal 14. The flat portion 21 also extends as far as a central tongue for soldering to the main part of terminal 14. Tongues 23 and 24 are separated by an indentation 25 which is obtained when the tongues are bent back from flat plates of desired size by stamping. In this configuration, the lateral portions 17 contribute to collecting heat on the sides of the capacitor and the central part therebetween drains away the heat collected by tongue 24, the rear portion 21 and the whole zone between this latter and tongue 24 serving as a heat sink, an electric contact being moreover established on connection 16.

FIG. 3 shows in section a capacitor according to FIGS. 2a and 2b. At terminals 14 and 14' and their lateral portions 18 are are soldered tongues 24 and 24' as well as tongues 23 and 23' through a layer of solder 19,19'. The terminals are preferably made from pure silver and are formed preferably from a silkscreen printing paste which will then be sintered. A pure silver paste gives, after baking, a terminal having a very good thermal connection.

In FIG. 4a, seen in a side view, the lateral portions 23 and 23' and connections 16 and 16' have at their ends a rounded part 28. There has already been shown in FIG. 2a the end of the lateral parts 17 having a rounded portion 20 in a top view. Thus, the edges of the connections which are facing each other on the lateral edges of the capacitor have a rounded contour avoiding flashovers between connections 16 and 16' when a high voltage is applied to the capacitor.

In FIG. 4b, the space between the edges of the connections receives an insulator 30, connections being for this reason located in anti-corona notches 31.

In FIGS. 5a and 5b, connections 26,26' soldered to terminals respectively 14,14' comprise lateral parts 27,27' and a narrower central part 29 so that the capacitor may be mounted directly on a thermal bridge of the user circuit which will grip round the central parts 29 and drain away directly the heat collected at the terminals. In this configuration, the connections no longer serve as a heat sink for removing heat. The heat is removed by a thermal connection formed by the thermal bridge of the user circuit.

FIG. 6 shows a variant of the invention where terminals 44,44' only have lateral extensions 48,48' on one side. The extensions 48,48' are situated on opposite lateral edges of the capacitor. The metalizations respectively 42 and 43 then take on in the example shown the shape of an L, the useful surface of the internal electrodes having also in this case a rectangular shape defined by the superimposed zones of the internal electrodes. Connections 36,36' have on one side a wider portion 32,32' respectively and lateral portions 37,37' for soldering to terminals 48,48' respectively, connections 36,36' also being soldered of course to the central portions of terminals 44,44'.

In FIG. 7, connections 46,46' have a central tongue 54,54' and lateral tongues 47,47' respectively, separated from each other by indentations 55,55' respectively, these indentations come from shaping the connection by stamping from a flat sheet. The ends of the central part 50,50' respectively of connections 46,46' have at their ends lugs respectively 49,49' obtained during stamping by bending back part 50' while forming rounded poritons 48,48' respectively. This configuration provides electrical and thermal connection of the capacitor at four points to the user circuit. It will be noted that lugs 47,47' and 54,54' have been shown upwardly directed, this configuration being more practical in the case in point.

The invention is not limited to the embodiment described and shown. Thus, the series resistance of the internal electrodes may be improved by splitting the internal electrodes as described in French patent application No. 82 09 451 filed n May 28th 1982 by the Applicant and entitled "A multi-layer ceramic capicitor and method of manufacturing same".

What is claimed is:

1. A multi-layered power capacitor comprising:
internal electrodes extending over a part of at least each of said layers;
connecting means for connecting said internal electrodes electrically and thermally in an alternate manner to junction edges of said capacitor;
a plurality of terminal means extending over a junction edge of said capacitor for providing an electrical surface for electrical contact to be made wherein said terminal means are single piece metalic members having a continuous surface adapted to extend an entire junction edge and at least on surface extending in part over at least one lateral edge and wherein said terminal means provides electrical and thermal conduction.

2. The capacitor as claimed in claim 1, wherein the edges of connecting means which are facing each other on the lateral edges are rounded.

3. The capacitor as claimed in claim 1, wherein the edges of connecting means which are facing each other on the lateral edges are disposed in anti-corona notches.

4. The capacitor as claimed in claim 1, wherein said internal electrodes are in the form of a T whose bar is, at its upper and lateral parts, in electrical and thermal contact with the corresponding terminal means.

5. The capacitor as claimed in claim 1, wherein the connecting means each comprise a flat region so that they may be mounted directly on a thermal bridge of the user circuit.

6. The capacitor as claimed in claim 1, wherein the connecting means comprise curved portions for connection thereof to the user circuit.

7. The capacitor as claimed in claim 6, wherein said curved portions are four in number.

* * * * *